Figure 1:
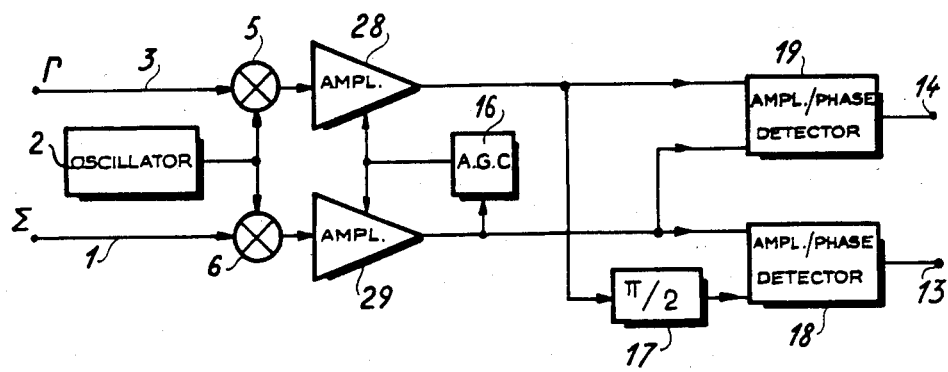

United States Patent [19]
Chabah

[11] Patent Number: 4,719,463
[45] Date of Patent: Jan. 12, 1988

[54] MICROWAVE RECEIVER MAKING DEVIATION MEASUREMENTS MORE ESPECIALLY IN COMBINATION WITH A SECONDARY AIRBORNE RADAR AND A SECONDARY RADAR CONTAINING IT

[75] Inventor: Maurice Chabah, Paris, France

[73] Assignee: Thomson CSF, Paris, France

[21] Appl. No.: 132,662

[22] Filed: Apr. 1, 1980

[30] Foreign Application Priority Data

May 2, 1979 [FR] France ............................... 79 11022

[51] Int. Cl.⁴ .......................... G01S 13/87; G01S 13/44
[52] U.S. Cl. ......................................... 342/43; 342/152
[58] Field of Search .............. 343/16 M, 5 NQ, 6.5 R; 342/43, 152

[56] References Cited

U.S. PATENT DOCUMENTS

| | | | |
|---|---|---|---|
| 3,890,617 | 6/1975 | Moulton | 342/149 X |
| 3,927,406 | 12/1975 | Bruder | 342/149 X |
| 4,139,850 | 2/1979 | Charlot et al. | 342/152 |
| 4,568,940 | 2/1986 | Diamond | 342/152 X |

Primary Examiner—T. H. Tubbesing
Attorney, Agent, or Firm—Cushman, Darby & Cushman

[57] ABSTRACT

A microwave deviation measurement receiver particularly applicable to airborne secondary radars making deviation measurements with two logarithmic amplifiers which increase the reliability of deviation measurements for targets close to the direction of aim of the radar. A programmable phase shifter preferably is controlled to compensate for aircraft movements by shifting the phase of the sum or control signal.

3 Claims, 2 Drawing Figures

MICROWAVE RECEIVER MAKING DEVIATION MEASUREMENTS MORE ESPECIALLY IN COMBINATION WITH A SECONDARY AIRBORNE RADAR AND A SECONDARY RADAR CONTAINING IT

The invention covers microwave receivers making deviation measurements with signals coming from point sources and more especially those of the airborne secondary radar type associated with IFF receivers.

In modern combat aircraft there are interrogation devices known in the technical field as IFF interrogators. These interrogation devices enable a pilot to identify targets interrogated and situated by an airborne primary radar. The small dimensions of these aircraft do not allow directional IFF interrogator antennas to be fitted. As the front end of the aircraft is usually occupied by the primary radar, it is necessary to associate the IFF interrogator antenna with that of the primary radar. It is then necessary to seek a compromise between the performance of the IFF interrogator and the interference caused by it to the operation of the primary radar. In particular, it is difficult to produce a control channel for the IFF interrogation, the classical solution which consists in using, for this channel, a source, which is not very directional, placed at the center of the antenna structure not being usable because the interference caused to the primary radar becomes intolerable.

Antennas with at least four elementary sources were then used to produce a sum $\Sigma$ and two difference $\Delta_1$ and $\Delta_2$ signals relative to the two planes of symmetry of the antenna, these two planes generally being perpendicular one with respect to the other. A coupling means which receives the $\Delta_1$ and $\Delta_2$ signals directly from the antenna then delivers a control signal $\Gamma = \Delta_1 + i\Delta_2$.

The receiver device properly speaking is then just at the output of the channels delivering the sum $\Sigma$ and control $\Gamma$ signals.

These receivers, depending on the type of production, have various disadvantages. One of them is related to an automatic gain control associated with the operation of an IFF receiver.

The device in accordance with the invention corrects this disadvantage by the use of an operator circuit which receives the sum $\Sigma$ and control $\Gamma$ signals and delivers the signals $\Sigma + i\Gamma$ and $\Sigma - i\Gamma$ to two logarithmic amplifiers.

In accordance with another characteristic of the invention, a programmable phase shifter placed between the antenna and an operator circuit in the antenna output channel delivering the sum $\Sigma$ signal or in the one delivering the $\Gamma$ signal enables their relative phase shift to be modified. This becomes a rotation round the antenna axes of the reference planes for which the $\Gamma$ and $\Sigma$ channels are in phase or in quadrature. This device enables elevation and bearing fixings to be retained with respect to a horizontal plane if the antenna is not provided with a roll stabilization mechanism intended to compensate for the movements of the aircraft carrying the device.

Figure 2:
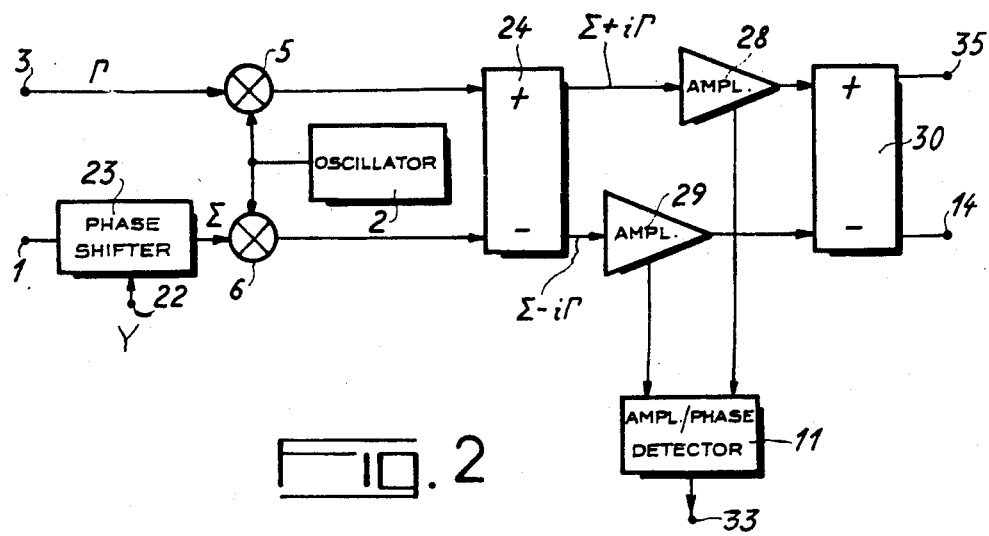

Other advantages and characteristics of the present invention will appear from the description which follows and the figures which show:

in FIG. 1 a microwave deviation measurement receiver in accordance with former practice, in FIG. 2 the block diagram of the device in accordance with the invention.

FIG. 1 shows an example of a microwave deviation mesurement receiver using the sum $\Sigma$ and control $\Gamma$ signals.

It contains a local oscillator 2 connected to two mixers 5 and 6 which also receive the $\Gamma$ and $\Sigma$ signals from terminals 3 and 1 respectively. The output of mixers 5 and 6 is connected to two amplifiers 28 and 29. The output of each of these amplifiers is connected to each of the two amplitude-phase detectors 18 and 19. It contains an automatic gain control circuit 16 connected between the output of amplifier 29 and the gain controls of amplifiers 28 and 29.

A $\pi/2$ phase shifter 17 is arranged at the input of amplitude-phase detector 18. The outputs of amplitude-phase detectors 18 and 19 are connected respectively to two terminals 13 and 14.

This circuit operates as follows.

The $\Sigma$ and $\Gamma$ signals are converted to the intermediate frequency by local oscillator 2 and mixers 5 and 6.

Amplifiers 28 and 29 amplify these signals.

Finally, amplitude-phase detectors 18 and 19 which receive the $\Gamma$ signal directly or through a $\pi/2$ phase shifter, 17, deliver signals proportional to $\Gamma/\Sigma \sin \Delta\phi$ and $(\Gamma/\Sigma) \cos \Delta\phi$ respectively, i.e. to angles defining the off-aim, in elevation and bearing for example $\Delta\phi$ was the phase shift between $\Gamma$ and $\Sigma$.

The disadvantage in this type of receiver is in the use of an automatic gain control which is hardly compatible with an IFF receiver.

FIG. 2 shows a preferred embodiment of the device in accordance with the invention which enables the preceding disadvantage to be avoided.

It comprises a local oscillator 2 the output of which is applied to the first input of two mixers 5 and 6 receiving respectively on their second input the control signal $\Gamma$ and the sum signal $\Sigma$ from two terminals 3 and 1 respectively. The output signal of both mixers is applied to a first operator 24 which delivers the signals $\Sigma + i\Gamma$ and $\Sigma - i\Gamma$ respectively to two logarithmic amplifiers 28 and 29. The output of these logarithmic amplifiers 28 and 29 is connected to a second operator circuit 30, which delivers on two terminals, 35 and 34 respectively, the sum and difference of the signals applied to its input. Logarithmic amplifiers 28 and 29 also have two intermediate outputs corresponding to the output of the first stage made up of limiter amplifiers. These intermediate outputs, from logarithmic amplifiers 29 and 28, are directly connected to an amplitude-phase detector 11. The signal coming from this amplitude-phase detector, 11, is available on terminal 33.

This device operates as follows.

The signals, $\log (\Sigma^2 + \Gamma^2)$ and $$\log \frac{\Sigma - i\Gamma}{\Sigma + i\Gamma}$$

corresponding respectively to the sum and the difference of the input signals $\text{Log} (\Sigma - i\Gamma)$ and $\text{Log} (\Sigma + i\Gamma)$ of the second operator circuit 30 are available at the outputs 35 and 34 of said second operator. The first corresponds to what is called the "presence" signal which is equivalent in practice to $\log \Sigma^2$ and enables the targets seen by the radar to be counted permanently. The signal, $$\log \frac{\Sigma - i\Gamma}{\Sigma + i\Gamma}$$

contains the data concerning the measurement of the deviation measurement angle, for example in elevation while the amplitude-phase detector receiving the $\Sigma+i\Gamma$ signal and the $\Sigma-i\Gamma$ signal delivers the measurement of the angle corresponding to the second deviation measurement, in bearing for example.

A microwave receiver has thus been described which can be used with all airborne type secondary radars.

What is claimed is:

1. A microwave receiver making deviation measurements, combined with an airborne secondary radar, with an antenna delivering $\Sigma$ and control $\Gamma$ signals, the latter being defined by $\Gamma=\Delta_1+i\Delta_2$ in which $\Delta_1$ and $\Delta_2$ correspond to deviation measurement signals along two orthogonal directions, elevation and bearing for example, comprising:

a local oscillator a first and a second mixer receiving the output signal of said local oscillator and respectively the sum signal $\Sigma$ and the control signal $\Gamma$, a first operator supplied with the output signals of the first and second mixers for delivering the output signals $\Sigma+i\Gamma$ and $\Sigma-i\Gamma$ respectively to a first and a second logarithmic amplifier, the output signals of which are applied to the input of a second operator delivering a first and a second output signal $\log(|\Sigma^2|+|\Gamma^2|)$ and $$\log \frac{\Sigma - i\Gamma}{\Sigma + i\Gamma}$$

containing respectively the presence information and a first angle error information; and a third operator delivering the second angle error information from the two signals $\Sigma+i\Gamma$ and $\Sigma-i\Gamma$.

2. A microwave receiver according to claim 1, wherein it further comprises adjustable means for varying the relative phase shift of the sum signal $\Sigma$ or the control signal $\Gamma$, said means being controlled by an external signal $\gamma$.

3. A microwave receiver according to any one of claims 1 and 2, wherein the first and second logarithmic amplifiers being provided with an intermediate output corresponding to the output of their first stage composed of a limiting amplifier, the third operator is an amplitude/phase detector supplied with the intermediate output signal of the two logarithmic amplifiers.

* * * * *